Patented Aug. 7, 1923.

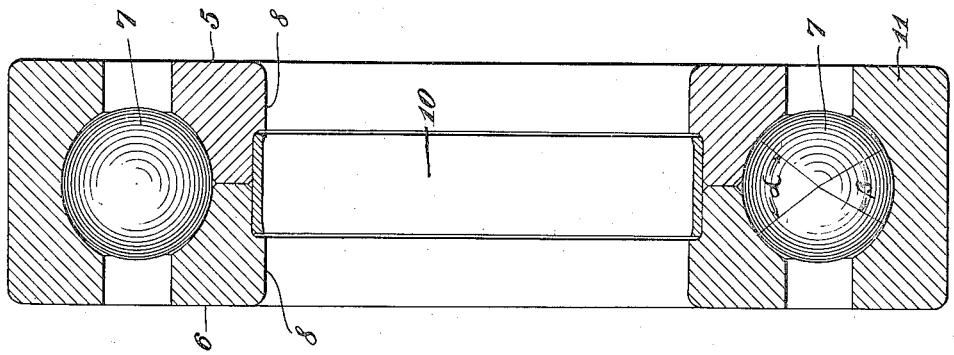
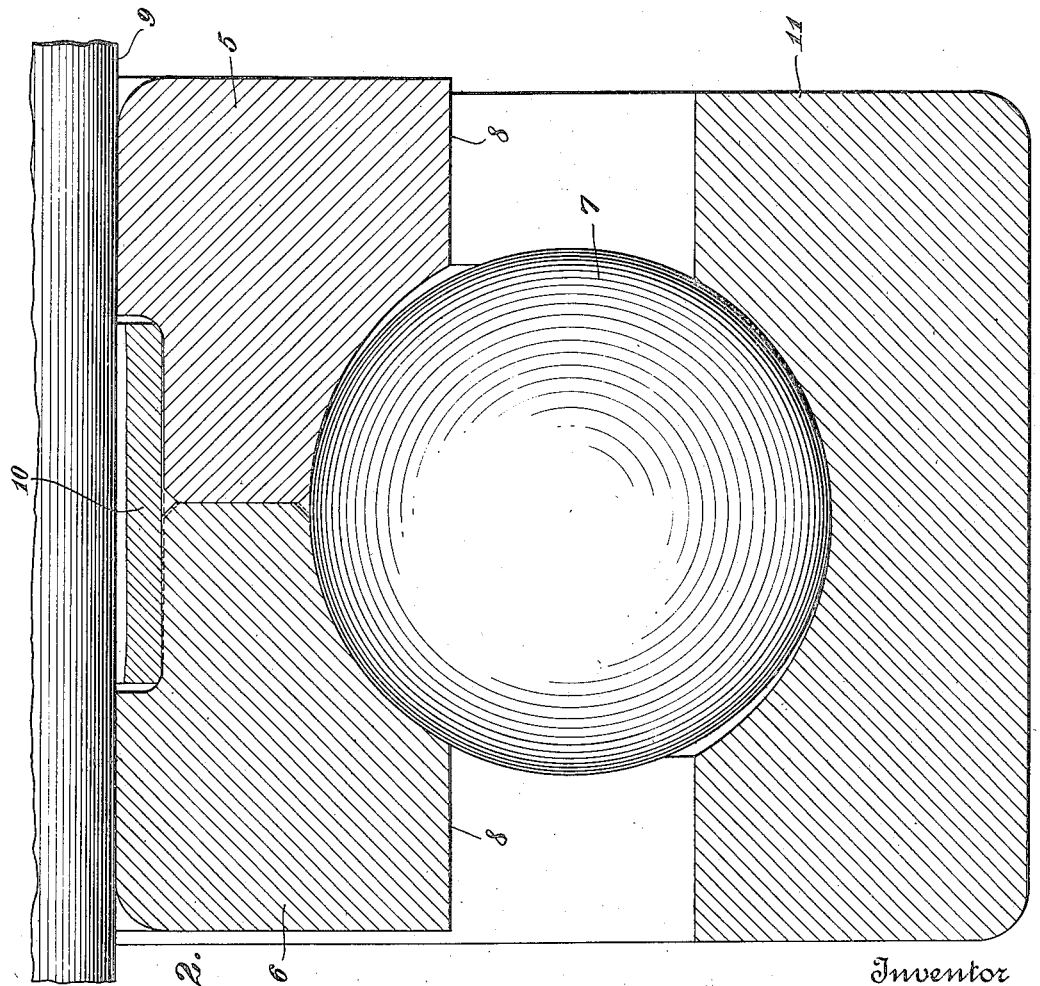

1,464,316

UNITED STATES PATENT OFFICE.

ALEXANDER J. GILLESPIE, OF CLEVELAND, OHIO.

ANTIFRICTION BEARING.

Application filed September 13, 1920. Serial No. 409,373.

*To all whom it may concern:*

Be it known that I, ALEXANDER J. GILLESPIE, a citizen of the United States, residing at Cleveland, in the county of Cuyahoga and State of Ohio, have invented certain new and useful Improvements in Antifriction Bearings, of which the following is a specification, reference being had therein to the accompanying drawing.

This invention relates to bearings of the so-called radial type, and while capable of use with various forms of rolling elements is more particularly adapted for a bearing in which the rolling elements are of spherical form, that is, balls. The improvement, while preferably taking the form of a radial bearing, is intended for use in those installations in which the bearing is required to sustain a considerable amount of thrust load, either in connection with or independently of radial load.

In the preferred form of my invention a very deep groove or race track is provided for the rolling elements, one of the race rings being made in two separable parts preferably dividing on a plane intersecting the central radial plane of the rings or on a plane which cuts the bottom of the groove. An object of the invention is to so fashion these ring parts that there is present a certain amount of resiliency or yieldability in the metal immediately supporting the race track or immediately supporting the portion of the groove upon which the ball tracks, so that this may yield incident to overload and bring other portions to such a position that the ball contacts with the track throughout a greater area. In a ball bearing the yieldability of the race track supporting portitons of the ring under radial load decreases the clearance between the ball and the sides of the groove and when the bearing is subjected to overload the ball has an extended area of race contact, the ball at such times functioning as a roller. A further object of this yieldability is to move the line upon which the balls track, or the center line of such track, up the side of the groove away from the bottom, so that the line running from point contact with one race to point contact with the other race assumes a greater angle to the radial line than is present in the ordinary deep groove ball bearing.

In the drawings accompanying this specification one practicable embodiment of my invention as applied to a ball bearing is illustrated. In which drawings—

Figure 1 is an axial section of a form of my improved bearing, and

Fig. 2 is an enlarged view, somewhat diagrammatical, of the parts shown in the lower portion of Figure 1, this view also adding a broken away portion of the shaft upon which the inner ring is mounted, the bearing in this view being assumed to be under a combined radial and thrust load.

It is obvious that both rings or either of these may be made according to my invention. In the present illustration, however, the ring to which my improvement is particularly directed is shown as the inner ring. Experience has demonstrated that the inner ring is the weak member of the annular bearing of existing types.

One of the rings of the ball bearing herein illustrated is shown made up of two portions 5, 6, which are respectively furnished with grooves forming the race track for the rolling elements 7, such elements in the present illustration being represented as balls, and the sections 5 and 6 as relating to the inner ring of the bearing. In the present illustration these sections 5, 6 are similar and interchangeable. The inner sides of the halves or parts of this two part ring abut one another, and their meeting edges are located in a plane which practically embraces the center line of the groove. These ring parts are chambered out adjacent the meeting edges opposite the bottom of the ball track or groove so that such track is formed upon yieldable or resilient portions thereof, and when the solid or normal portions 8 of such rings are mounted on a supporting member, as for instance the shaft 9, these parts act as cantilevers, and under load yield toward the support. The amount of yielding increases as the load becomes greater and should preferably reach its maximum at the maximum of overload.

The two parts 5 and 6 of the ring are connected with a uniting member or sleeve 10, which is located in the chamber. This ring is of sufficient proportions that it securely engages the ring parts and holds these together, and is of such thickness that it does not engage with the surface of the part upon which the surfaces 8 and 8 are mounted, but is sufficiently free thereof to permit the desired yieldability of the cantilever ends of these ring parts. The sleeve or connector 10 is primarily to hold the parts together as a self-contained handling unit and is so seated in the chamber that it does not impede the yielding of the cantilever ends. In assembling the bearing the ring 11, which cooperates with the two part ring, in the present instance the outer ring, receives in its race groove the complement of balls, the connector 10 is forced into one of the parts of the two part ring, and then the two parts 5 and 6 are presented to the balls from opposite sides and assembled by forcing these parts upon the connecting sleeve 10. This connecting sleeve is then in a position where it is securely housed and hidden when the bearing is in position for use.

In the Figure 2 position the bearing is assumed to be under a considerable amount of axial or thrust load, whereas, in Figure 1 the bearing is assumed to be supporting a pure radial load. When the bearing is supporting radial load unaccompanied by any considerable axial or thrust load both the cantilever portions yield in a substantially uniform manner, and by such yielding the cross sectional area of the race groove is lessened to such an extent that the amount of clearance between the ball and the sides of the race groove is lessened, with the effect that such sides engage the sides of the ball more and more as the load increases. Preferably, under conditions of overload, in which of course is included shock loads, to which any particular bearing is liable to be subjected, the maximum of this surface engagement is reached at the height of the overload. The side engagement of the ball momentarily, that is, assuming the overload to be momentary, functions as a roller bearing rather than as a ball bearing. The expressions normal load and overload are, of course, relative terms. In many installations the metal directly supporting the rolling elements while free to yield under load, as a matter of fact yields imperceptibly at normal load and to a greater extent at overload. As an illustration of the manner in which my improved bearing rings function differently from the bearing rings heretofore in use, reference is made to the lower portion of Figure 1, wherein the angle $\alpha$ represents the increased arc of contact of the balls with the yielded races, and the angle $\beta$ represents the lesser arc of contact of the same ball under the same conditions with the ordinary type of ring.

It is to be understood that the form of the invention shown in the drawings is illustrative, and that changes may be made within the scope of the claims without departing from the spirit of my invention.

I claim as my invention:

1. A roller bearing comprising a two part ring formed with a race groove at the meeting edges and the ring parts being chambered out opposite the race groove whereby the metal directly supporting the rolling elements is free to yield when under load.

2. A roller bearing as called for in claim 1 there being a sleeve located in the said chamber and uniting the parts into a self-contained handling unit.

3. A roller bearing comprising a two part ring formed with a race groove at the meeting edges the parts being chambered out opposite the race groove, and a sleeve located in said chamber and uniting the parts into a self-contained handling unit.

4. An anti-friction bearing embodying a row of rolling elements and a race ring comprising a pair of cantilever structures having their free ends abutting one another, there being a track for said rolling elements formed upon such free ends.

5. An anti-friction bearing embodying a row of balls or rollers and a race ring comprising a pair of cantilever structures having their free ends abutting one another, and formed with a race groove having its centre line in the plane of the said abutting free ends.

6. A bearing as called for in claim 4, having the sides of the cantilevers opposite the race groove chambered out for the purpose of increasing the resiliency of the rings at and adjacent the grooves.

7. A bearing as called for in claim 5, having the surface of the rings opposite that provided with the race groove formed at the outer sides with support engaging extensions and at the inner side being chambered out to be clear of such support.

8. An anti-friction bearing embodying a row of balls or rollers and a race ring comprising a pair of cantilever structures having their free ends abutting one another and formed with a race groove, said structures being substantially similar and interchangeable, the surface of the rings opposite that provided with a race track being formed at the outer sides with support engaging extensions, and at the inner sides being chambered out, and a sleeve in such chamber engaging the walls thereof for holding the parts together, the sleeve being of suitable proportions to clear the surface of the support.

9. An anti-friction roller bearing comprising inner and outer rings each having a race groove, one of these rings being formed in two parts having their meeting faces disposed radially of the bearing, such parts being chambered out adjacent the meeting faces and opposite the race groove, and a sleeve located in the said chamber and connecting the parts.

10. A bearing as called for in claim 9, wherein the face of the sleeve is located inwardly of the face of the adjacent portions of the ring.

11. A roller bearing ring composed of two halves or sections having a race groove, the ring sections radially of the groove being resilient, and laterally of the groove being rigid.

12. A roller bearing comprising a two part ring formed with a race groove at the meeting edges and each of such parts having a circumferential rabbet in the said meeting edges, and a sleeve or connecting member of less thickness than the depth of the rabbet seated therein and uniting the parts into a self-contained handling unit.

13. An anti-friction bearing comprising a ring formed in two parts and provided with a race groove having its centre in the plane of the junction of said parts, the rings opposite the race groove being chambered out, and a connecting sleeve located in such chamber and connecting the said two parts as a self-contained handling unit, the exposed surface of said sleeve when in position lying beyond the outer surface of the rings whereby the member upon which the ring is mounted may directly engage the surface of both such ring parts and be free of contact with the sleeve.

14. In a ball bearing, the combination with a pair of rings each provided with a deep groove or race track, of a set of balls located therein, one of the rings being made in two separate parts dividing on a plane cutting the bottom of the groove, such ring parts being so fashioned that they possess a certain amount of resiliency or yieldability in the portions immediately supporting the race track or immediately supporting the portion of the groove upon which the balls track whereby this may yield incident to overload for bringing other portions to such a position that the ball contacts with the track throughout a greater area.

15. In a ball bearing, the combination with a pair of rings each provided with a deep groove or race track, of a set of balls located therein, one of the rings being made in two separate parts dividing on a plane cutting the bottom of the groove, such ring parts being so fashioned that they possess a certain amount of resiliency or yieldability in the portions immediately supporting the race track or immediately supporting the portion of the groove upon which the balls track, whereby this may yield incident to overload thereby moving the line upon which the balls track up the side of the groove away from the bottom so that the line running from point contact with one race to point contact with the other race assumes a greater angle to the radial line of the bearing than is present in the ordinary deep groove ball bearing.

In testimony whereof, I have affixed my signature hereto.

ALEX J. GILLESPIE.